United States Patent
Scharf (10) Patent No.: US 9,004,523 B2
(45) Date of Patent: Apr. 14, 2015

(54) TONGUE WEIGHT DONUT SCALE

(71) Applicant: Roger W. Scharf, St. Augustine, FL (US)

(72) Inventor: Roger W. Scharf, St. Augustine, FL (US)

(*) Notice: Subject to any disclaimer, the term of this patent is extended or adjusted under 35 U.S.C. 154(b) by 0 days.

(21) Appl. No.: 14/267,297

(22) Filed: May 1, 2014

(65) Prior Publication Data

US 2014/0327229 A1  Nov. 6, 2014

Related U.S. Application Data

(60) Provisional application No. 61/854,791, filed on May 2, 2013.

(51) Int. Cl.
| | |
|---|---|
| *B60D 1/06* | (2006.01) |
| *B60D 1/62* | (2006.01) |
| *B60D 1/24* | (2006.01) |
| *G01G 19/08* | (2006.01) |

(52) U.S. Cl.
CPC ........ *B60D 1/248* (2013.01); *B60D 1/06* (2013.01); *G01G 19/08* (2013.01); *B60D 1/62* (2013.01)

(58) Field of Classification Search
USPC .............. 280/422, 511; 701/124; 73/795, 73/862.045
See application file for complete search history.

(56) References Cited

U.S. PATENT DOCUMENTS

| | | | | |
|---|---|---|---|---|
| 3,700,053 A | * | 10/1972 | Glissendorf | 177/136 |
| 3,854,540 A | * | 12/1974 | Holmstrom, Jr. | 177/136 |
| 4,319,766 A | * | 3/1982 | Corteg et al. | 280/511 |
| 6,053,521 A | * | 4/2000 | Schertler | 280/511 |
| 6,253,626 B1 | * | 7/2001 | Shoberg et al. | 73/862.044 |
| 6,494,478 B1 | * | 12/2002 | MacKarvich | 280/489 |
| 6,722,684 B1 | * | 4/2004 | McAllister | 280/483 |
| 7,032,920 B1 | * | 4/2006 | Peng | 280/511 |
| 2003/0093188 A1 | * | 5/2003 | Morita et al. | 701/1 |
| 2005/0283296 A1 | * | 12/2005 | Viaud | 701/50 |
| 2006/0032679 A1 | * | 2/2006 | Wilson et al. | 177/136 |
| 2006/0290102 A1 | * | 12/2006 | VanBuskirk, Jr. | 280/511 |
| 2010/0114437 A1 | * | 5/2010 | Boss et al. | 701/48 |
| 2010/0332049 A1 | * | 12/2010 | Sy et al. | 701/1 |
| 2012/0024081 A1 | * | 2/2012 | Baker | 73/862.338 |
| 2013/0038436 A1 | * | 2/2013 | Brey et al. | 340/431 |
| 2013/0253814 A1 | * | 9/2013 | Wirthlin | 701/124 |
| 2014/0110918 A1 | * | 4/2014 | McCoy | 280/511 |

OTHER PUBLICATIONS

Johnston, "Load Master Scale", in Trailer Life, pp. 56 and 58, Oct. 1995.
Luebben, "Transportation Tales of Terror: How to avoid trailer-towing disasters", in Sunshine Artist, pp. 12-15, Sep. 2006.

* cited by examiner

*Primary Examiner* — Anne Marie Boehler
*Assistant Examiner* — Maurice Williams (57) ABSTRACT

A tongue weight donut scale includes a tongue weight donut scale body having an upper planar surface, a lower planar surface, and a central opening having an inner diameter, a weight sensor coupled to the tongue weight donut scale body and generating a signal representative of a weight on the tongue weight donut scale, an indicator box converting the signal from the weight sensor into a weight value and providing a weight value output, and a display window displaying the weight value output. The tongue weight donut scale detects the tongue weight of a trailer attached to a trailer hitch ball, when the tongue weight donut scale is installed between the base of the trailer hitch ball and the ball support of a trailer hitch.

18 Claims, 7 Drawing Sheets

Fig. 1

PRIOR ART

TONGUE WEIGHT DONUT SCALE

REFERENCE TO RELATED APPLICATIONS

This application claims one or more inventions which were disclosed in Provisional Application No. 61/854,791, filed May 2, 2013, entitled "TONGUE WEIGHT DOHNUT SCALE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of weights and measurements. More particularly, the invention pertains to a tongue weight donut scale.

2. Description of Related Art

Trailer hitch systems sold in the United States have labeling that indicates the maximum rated total weight capacity and the maximum tongue weight capacity. These are also the hitch systems legal capacities. Distributor and retailers recommend and supply consumers with devices for measuring these limits, including the tongue weight of a towed vehicle. All such devices presently on the market must be used when the towed vehicle is "unhitched" from the towing vehicle. Their use can be dangerous, very cumbersome, time-consuming, labor-intensive, unstable, and discouraging, especially for someone not mechanically inclined or physically strong. The more steps you have to take in any mechanical procedure or task the more that things can go wrong.

Also, because of the arduous task of having to use present day devices to check trailer tongue weight, many people ignore checking it, heading down the public highways endangering themselves and possibly everyone else they meet on the highway.

Most drivers are not fully aware of how important it is to have the tongue weight imposed on their hitch system in a safe range. There are major negative safety issues associated with improperly applied tongue weights, either too high or too low.

Many states in the United States have laws relating to the lawful towing of a vehicle or trailer on the public highways. Lives are at stake when hauling takes place without knowing the tongue weight is within safe and legal limits. Safety and liability in case of an accident are only two of the very important issues that compel the towing consumer to be aware and know their legal and safe towing tongue weight.

Current devices being used to measure tongue weight include bathroom scales, pump type jacks, and public platform scales.

U.S. Patent Application Publication No. 2006/0290102, entitled "Weight Sensing Trailer Ball" by VanBuskirk and published Dec. 28, 2006, discloses a trailer ball device with an integral sensing mechanism to detect a force exerted on the trailer ball, such as the tongue weight of a trailer. In order to be used, the trailer ball device must be installed as the towing vehicle's custom trailer ball, or in place of a removable trailer ball, on the hitch of a towing vehicle.

Johnston ("Load Master Scale", in Trailer Life, pp. 56 and 58, October 1995) reviews a measuring device (Sherline Products, Vista, Calif., USA) that may be placed under a trailer tongue to measure the tongue weight of a trailer.

The above-mentioned references are hereby incorporated by reference herein.

SUMMARY OF THE INVENTION

A tongue weight donut scale includes a tongue weight donut scale body having an upper planar surface, a lower planar surface, and a central opening having an inner diameter, a weight sensor coupled to the tongue weight donut scale body and generating a signal representative of a weight on the tongue weight donut scale, an indicator box converting the signal from the weight sensor into a weight value and providing a weight value output, and a display window displaying the weight value output. The tongue weight donut scale detects the tongue weight of a trailer attached to a trailer hitch ball, when the tongue weight donut scale is installed between the base of the trailer hitch ball and the ball support of a trailer hitch.

DETAILED DESCRIPTION OF THE INVENTION

A tongue weight donut scale may be built-in as an integral part of a hitch ball or hitch draw bar or other compatible structural part of a trailer hitch system. This can be done in any one of several different ways, including, but not limited to, increasing the size or dimensions of the structural parts to which the tongue weight donut scale is integrated and routing out a space for placement of the tongue weight donut scale.

A tongue weight donut scale preferably affords the consumer the opportunity of determining the tongue weight of their towed trailer without the physical risks and toil of using conventional methods. As used herein, the term "tongue weight" means a downward force exerted by the tongue of a trailer onto the hitch ball of a trailer hitch. In a preferred embodiment, a tongue weight donut scale is a semi-permanent fixture on the towing vehicle.

The tongue of the towed vehicle, or trailer, may be attached to the hitch ball before the tongue weight is taken. This eliminates the fears of movement of the trailer, the tongue falling, an improper height of the tongue when weighing, instability, and labor issues during weighing and is considerably faster than conventional methods.

A tongue weight donut scale is preferably very portable, light-weight, made of structurally sound and environmentally acceptable materials, versatile, small, safe, stable, quick, easy to use, waterproof, and harsh weather-resistant. In some embodiments, the scale body is made of stainless steel.

A tongue weight donut scale is preferably a very convenient, portable, quick, and easy way to determine the tongue weight of a trailer, while it is attached to the towing vehicle. A tongue weight donut scale preferably gives a real-time readout of the weight the trailer tongue is currently imposing onto a vehicle hitch system.

A tongue weight donut scale preferably includes a sensing mechanism, where the weight of the trailer tongue is detected when the trailer is coupled to the hitch ball. The weight is converted into a measurable signal and displayed in a unit of measure in a light-emitting diode (LED) window.

The readable display may be a simple digital LED device that displays the tongue weight so that a user can visually inspect or read the weight, or other perceptible indications of the tongue weight may be used. Several read-out display techniques may be used, including, but not limited to, an electronic valve, an analog dial or gauge, an amplitude output signal, or a pressure output signal. Also, the display may be configured to meet different thresholds of pre-determined criteria for safety, including, but not limited to, maximum values, minimum values, and graduated values.

It is preferably very convenient, quick, and easy to determine the tongue weight of the trailer when it is attached to the hitch ball. In some embodiments, a tongue weight donut scale is a portable weight scale that is attached to a trailer hitch ball assembly as a portable accessory and gives a live read-out of the trailer tongue weight when the trailer is attached to a tow vehicle.

A tongue weight donut scale preferably measures the approximate downward force exerted by the tongue of a trailer on a trailer hitch. A weight sensing mechanism or tongue weight donut scale is preferably placed directly under a hitch ball and through the ball's anchoring bolt, all of which are anchored and tightened to the draw bar of the trailer hitch assembly. A user views a read-out to determine the effective weight of an attached trailer at the point of connection to the hitch ball. The read-out is preferably seen through a display window, which is preferably an integral part of the indicator box and the weight sensing mechanism.

In some embodiments, a tongue weight donut scale is designed to work with all existing popular sizes of hitch balls and draw bars. The tongue weight donut scale preferably tells the user what the tongue weight of the trailer is, at the exact moment, at the exact location, at the exact position, at the exact time, and at the exact temperature the display is read. A tongue weight donut scale is preferably much faster, more portable, much more convenient, more stable, greaseless, and much easier to use than conventional devices.

Figure 1:
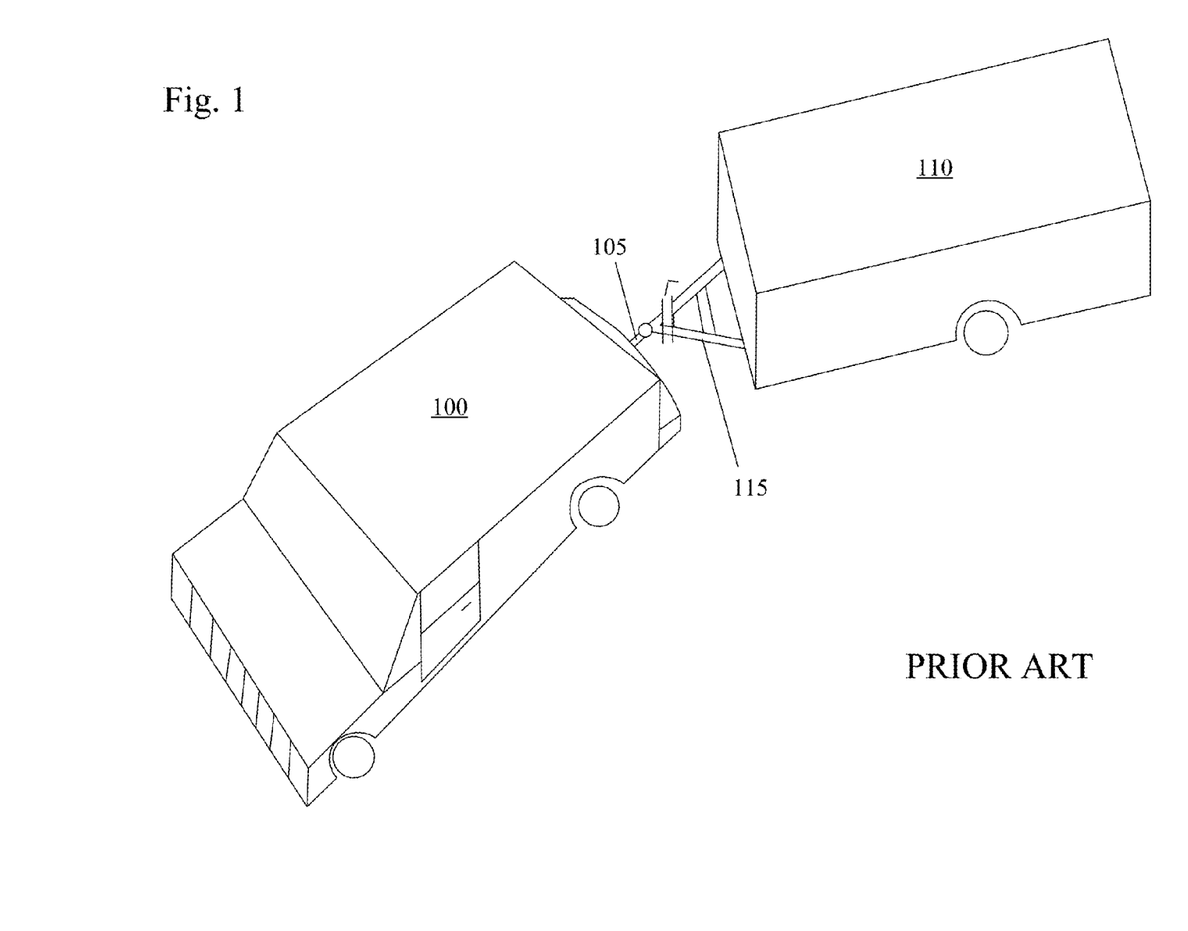
FIG. 1 shows a towed vehicle attached to the hitch of a towing vehicle as known in the prior art.

A towing vehicle 100 with a trailer hitch 105 is attached to a towed vehicle 110 by a trailer tongue 115 as shown in FIG. 1.

Figure 2:
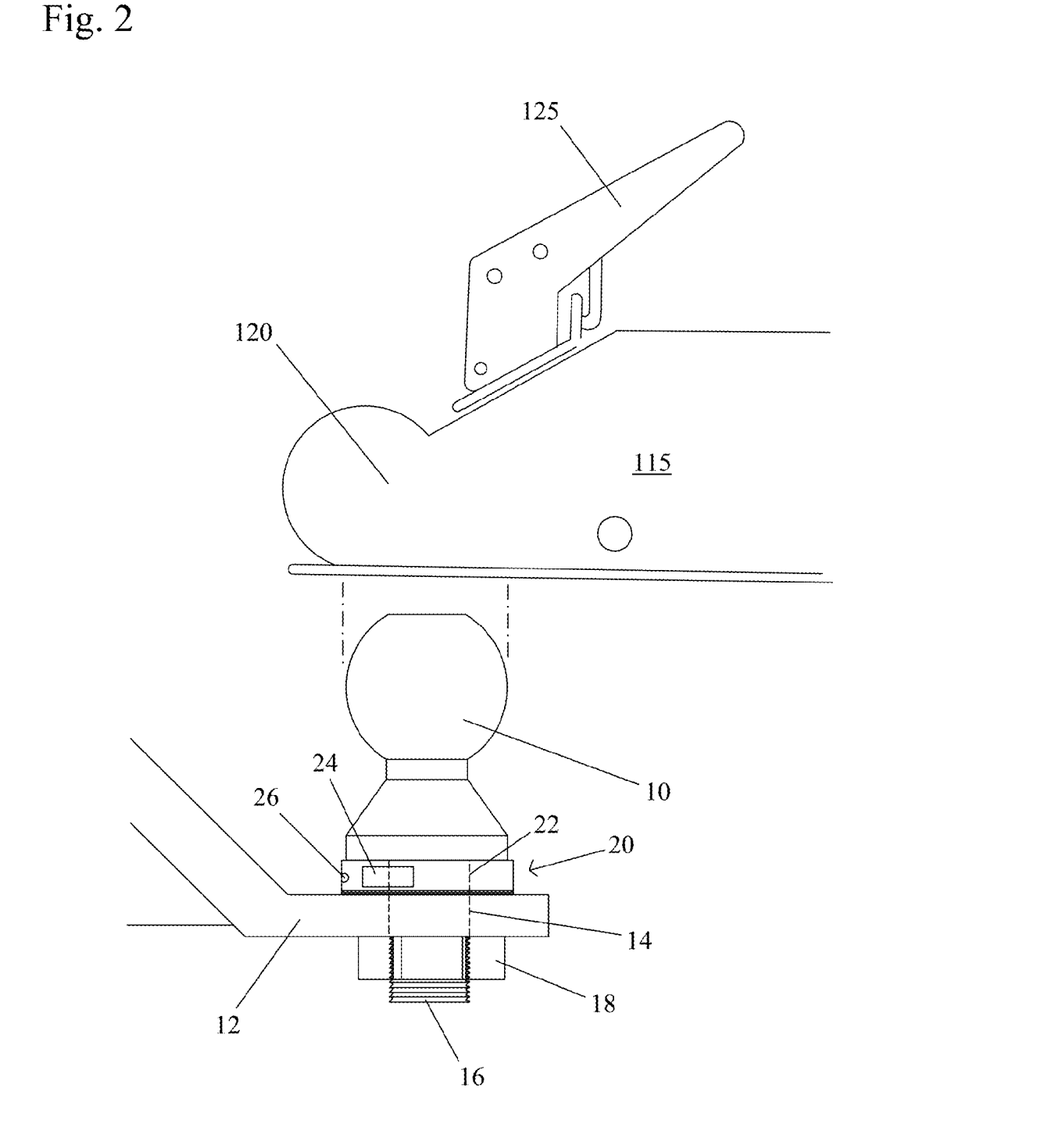
FIG. 2 shows a towed vehicle being connected to a towing vehicle with a tongue weight donut scale under the hitch ball in an embodiment of the present invention.

Referring to FIG. 2, the tongue weight donut scale 20 is mounted between the hitch ball 10 and the ball mount 12 on the towing vehicle. The hitch ball anchor bolt 16 extends through an opening 22 in the tongue weight donut scale 20 and then through an opening 14 in the ball mount 12. The assembly is held in place by a hitch ball nut 18 threaded onto the end of the hitch ball anchor bolt 16. The trailer tongue 115 is shown with the trailer tongue coupler 120 positioned over the hitch ball 10 ready to be coupled to the hitch ball 10 and measured by the tongue weight donut scale 20. A clamp handle 125 actuates a clamp to maintain the trailer tongue coupler 120 on the hitch ball 10.

The diameter of the opening 22 in the tongue weight donut scale 20 is preferably sized to be equal to or slightly larger than the diameter of the hitch ball anchor bolt 16 of the hitch with which the tongue weight donut scale 20 is being used. Commercial hitch ball anchor bolts are typically about ¾-inch, 1-inch, or 1¼-inch in diameter. The diameter of the opening 22 is preferably in the range of about ¾-inch to about 1¼-inch. In some embodiments, the diameter of the opening 22 is about ¾-inch or slightly larger. In other embodiments, the diameter of the opening 22 is about 1-inch or slightly larger. In yet other embodiments, the diameter of the opening 22 is about 1¼-inch or slightly larger. In other embodiments, the tongue weight donut scale 20 is customized to a custom trailer hitch design and has a diameter of the opening 22 equal to or slightly larger than the diameter of the hitch ball anchor bolt 16 of the custom trailer hitch design.

The outer diameter of the scale body 30 of a tongue weight donut scale 20 is preferably sized according to the dimensions of the ball mount 12 of the hitch with which the tongue weight donut scale 20 is being used. Commercial ball mount 12 dimensions typically increase with an increase in diameter of the ball mount opening 14, and hence with the diameter of the hitch ball anchor bolt 16. In some embodiments, for a ¾-inch diameter hitch ball anchor bolt 16, the outer diameter of the scale body 30 is about 55 millimeters (about 2.17 inches). In some embodiments, for a 1-inch diameter hitch ball anchor bolt 16, the outer diameter of the scale body 30 is about 64 millimeters (about 2.52 inches). In some embodiments, for a 1¼-inch diameter hitch ball anchor bolt 16, the outer diameter of the scale body 30 is about 72 millimeters (about 2.83 inches).

The weight detection range of the tongue weight donut scale 20 preferably correlates with the safe tongue weight range for the hitch with which the tongue weight donut scale 20 is being used. Most commercial trailer hitches have a maximum safe tongue weight in the range of about 300 pounds to about 1000 pounds. In some embodiments, the tongue weight donut scale 20 can measure a tongue weight of up to about 1000 pounds. In some embodiments, the tongue weight donut scale 20 can measure a tongue weight of up to about 2000 pounds. In some embodiments, the tongue weight donut scale 20 can measure a tongue weight of up to about the maximum safe tongue weight of the hitch with which the tongue weight donut scale 20 is being used.

The tongue weight donut scale includes at least one weight sensor. Any type of weight sensor, including, but not limited to, an electronic weight sensor and a mechanical weight sensor, may be used within the spirit of the present invention. The weight sensor is preferably an electronic weight sensor, and more preferably a load cell weight sensor. The load cell weight sensor includes a load cell with a transducer that converts force into a measurable output signal. The load cell may be located at or near the upper surface or the lower surface of the tongue weight donut scale. This is preferably achieved using one or more strain gauges, which measure the strain on the top surface of the scale body cause by the tongue weight. In some embodiments, this strain is in the form of the deflection of a beam in the load cell supporting the weight. The strain gauges, which are bonded onto the underside of the top surface and wired into a Wheatstone bridge configuration, measure this deflection, which is then converted into a weight. The strain gauges operate as length-sensitive electrical resistors, which convert the relative physical strain into a relative electrical output. A signal is then sent to an indicator box, transforming it into a readable tongue weight output signal proportional to the detected force and displayed through the display window.

A load cell, as used herein, is preferably a transducer that converts force into a measurable electrical output. This conversion is indirect and happens in two stages. Through a mechanical arrangement, the force being sensed deforms a strain gauge. Although there are many varieties of load cells, strain gauge based load cells are the most commonly used type. In these embodiments, strain gauges are located under the top planar surface and are deflected when a top load (tongue weight) is applied to the hitch ball and transferred down onto the top planar surface of the load cell. There are many variations of load cells that may be used to achieve the desired results within the spirit of the present invention.

Figure 5:
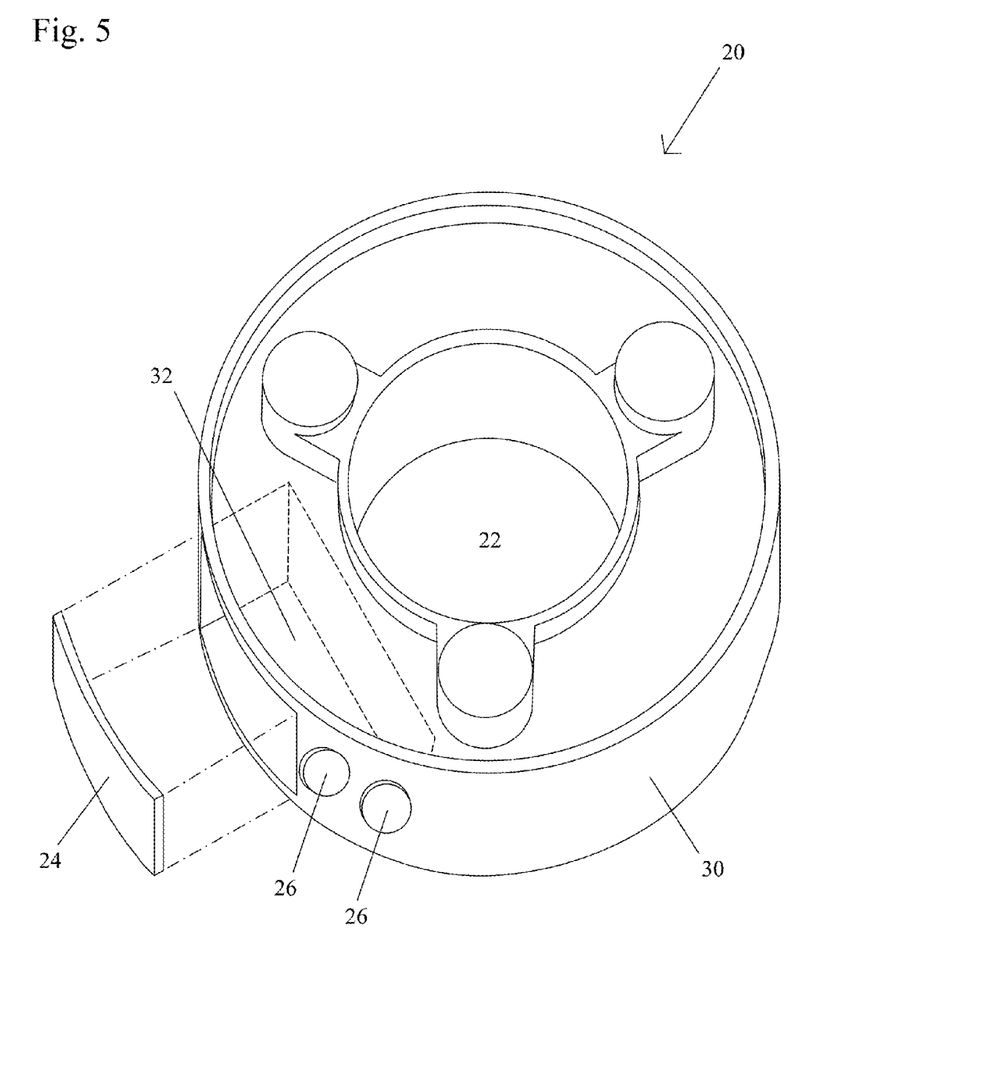
FIG. 5 shows a bottom perspective view of the tongue weight donut scale shown in FIG. 2.

The hitch ball 10 sits on a load cell to detect a force exerted on the hitch ball 10, such as the effective weight of the tongue 115 of a trailer by way of its trailer tongue coupler 120. The tongue weight that is applied to the hitch ball 10 is transmitted through the hitch ball 10 onto the load cell of the tongue weight donut scale 20, and a weight value is signaled to display in a display window 24, showing the results of the force as weight. The tongue weight donut scale 20 also includes one or more calibration buttons 26. The tongue weight donut scale 20 also includes at least one strain gauge 28, although preferably at least four strain gauges are used as part of the weight sensor.

Figure 3:
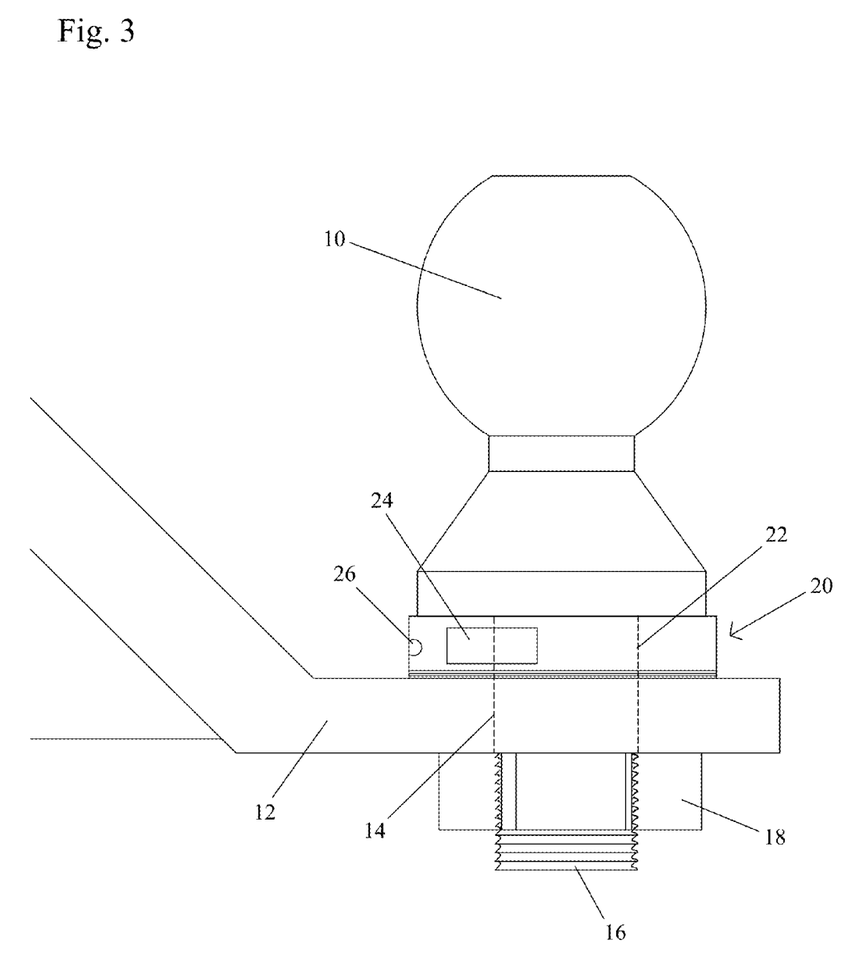
FIG. 3 shows a side view of the towing vehicle hitch shown in FIG. 2.
Figure 4:
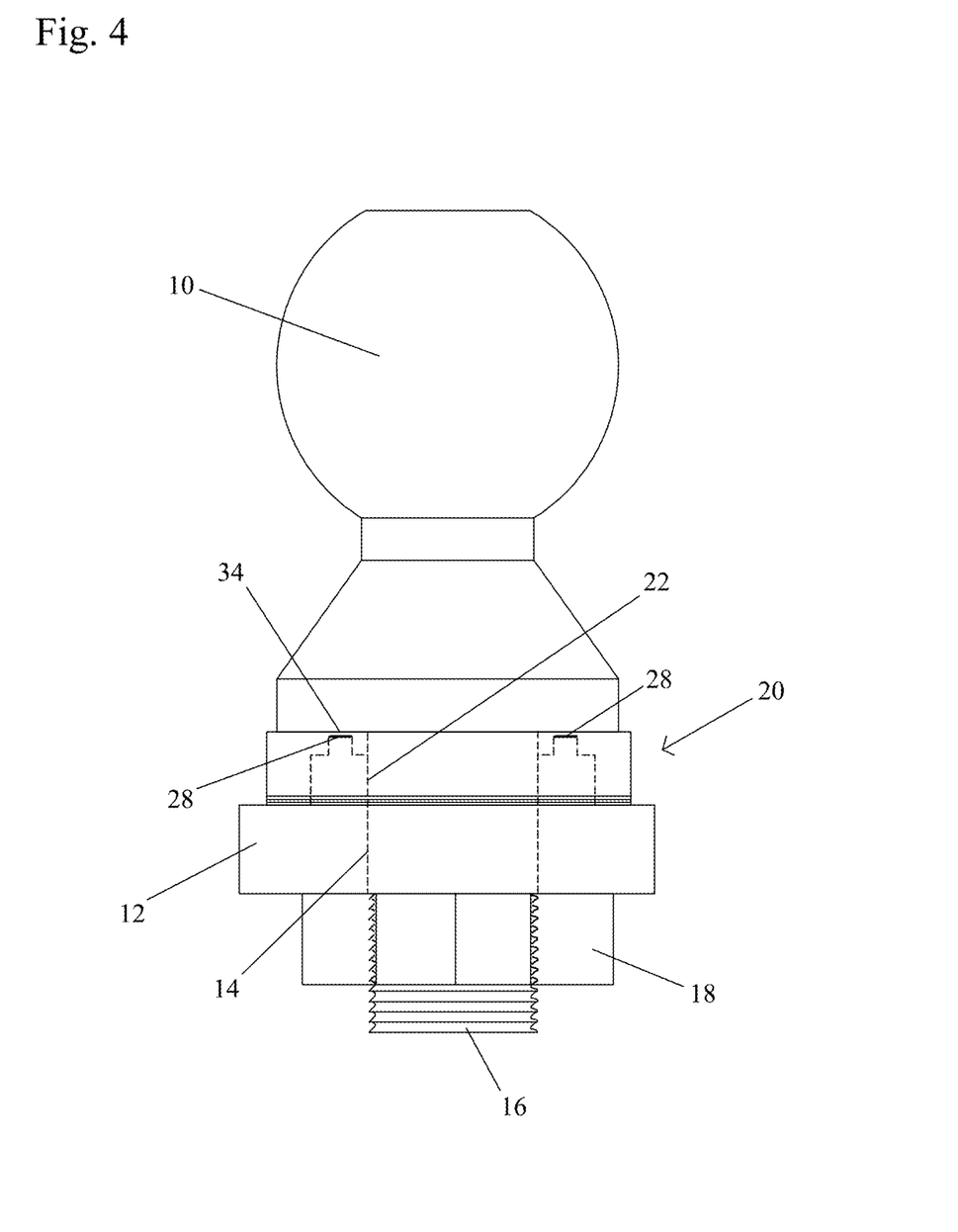
FIG. 4 shows an end view of the towing vehicle hitch shown in FIG. 2.

The tongue weight donut scale 20 measures the approximate downward force exerted by the tongue of a trailer on the trailer hitch. Referring to FIG. 3 and FIG. 4, the tongue weight donut scale 20 is placed directly under the hitch ball 10 and through the hitch ball anchor bolt 16, all of which are anchored and tightened to the ball mount 12 of the trailer hitch assembly. A read-out is viewed by a user to determine the apparent tongue weight of an attached trailer at the point of connection to the hitch ball 10. The read-out is seen through a display window 24, which is an integral part of the indicator box of the tongue weight donut scale 20. More specifically, the tongue weight donut scale 20 has a load cell that is configured to receive and detect the weight applied by the attached trailer tongue.

A strain gauge, as used herein, preferably includes a very fine wire or metallic foil arranged in a grid pattern. The grid pattern maximizes the amount of metallic wire or foil subject to strain in the parallel direction. The cross-sectional area of the grid is minimized to reduce the effect of shear strain and Poisson Strain. The grid is bonded to a thin backing, called the carrier, which is attached directly to the test specimen, in this case, the underside of the top planar surface of the scale body. Therefore, the strain experienced by the test specimen is transferred directly to the strain gauge, which responds with a linear change in electrical resistance. Strain gauges are available commercially with nominal resistance values in the range of 30 to 3,000Ω with 120, 350, and 1,000Ω being the most common values.

One strain gauge 28 design is shown schematically in FIG. 4. Each strain gauge 28 is attached to a surface in a recess in the scale body 30 on the underside of the top planar surface below a load cell strain surface 34. Any design, however, that provides sufficient weight sensing may be used within the spirit of the present invention. The load cell strain surface 34, whose deflection is detected by the strain gauges 28, preferably makes up only a portion of the upper surface and may extend slightly above the remaining portion of the upper surface, as shown in FIG. 5 and FIG. 6.

A trailer is coupled to a trailer hitch ball 10 such that the effective weight of the tongue of the trailer, when at rest, is received at the top of the hitch ball. The force, considered a downward force, or weight, goes directly down through the trailer hitch ball 10 to its base and onto the tongue weight donut scale 20. Accordingly, the tongue weight donut scale 20, located directly under the hitch ball 10 base detects the applied downward force or weight.

The scale body 30 has an annular shape and serves as the load cell. The display 24 and the indicator box 32 containing its internal workings may be located discreetly within the confines of the scale body 30 itself as shown in FIG. 5, or made as an extension from the donut scale body 30 as shown in FIG. 6 and FIG. 7. If an extension from the donut scale body 30 is used, the extension is preferably placed at the back of the hitch ball 10 to make it less vulnerable to damage. Alternatively, locating the indicator box 32 within the outer circumference of the scale body 30 provides more protection and a flush and smooth appearance. Although an integrated display is shown in the drawings, a remote, wired or wireless, display may alternatively be used. Such a display may be clipped, for example, to the driver's sun visor to provide the driver with the effective tongue weight as the driver is driving the towing vehicle. As the effective tongue weight changes drastically based on the relative elevation of the towed vehicle with respect to the rear and front wheels of the towing vehicle, such a display may be used to warn the driver of potential or actual danger when driving over uneven terrain.

Figure 6:
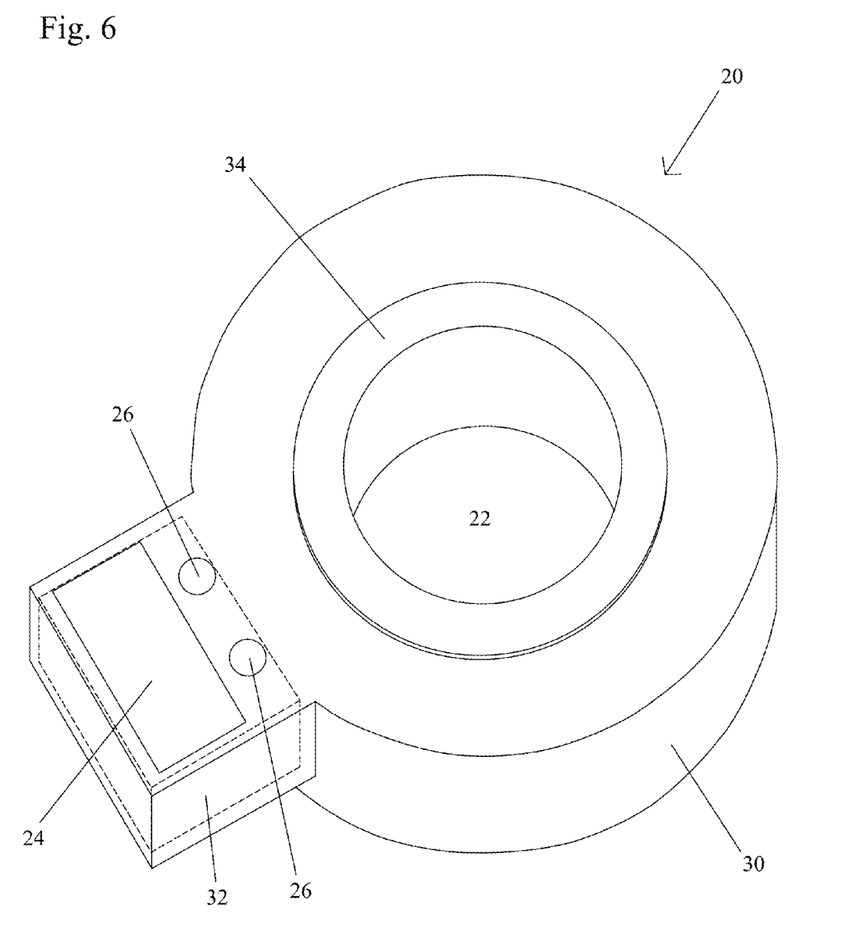
FIG. 6 shows a top perspective view of a tongue weight donut scale in an embodiment of the present invention.
Figure 7:
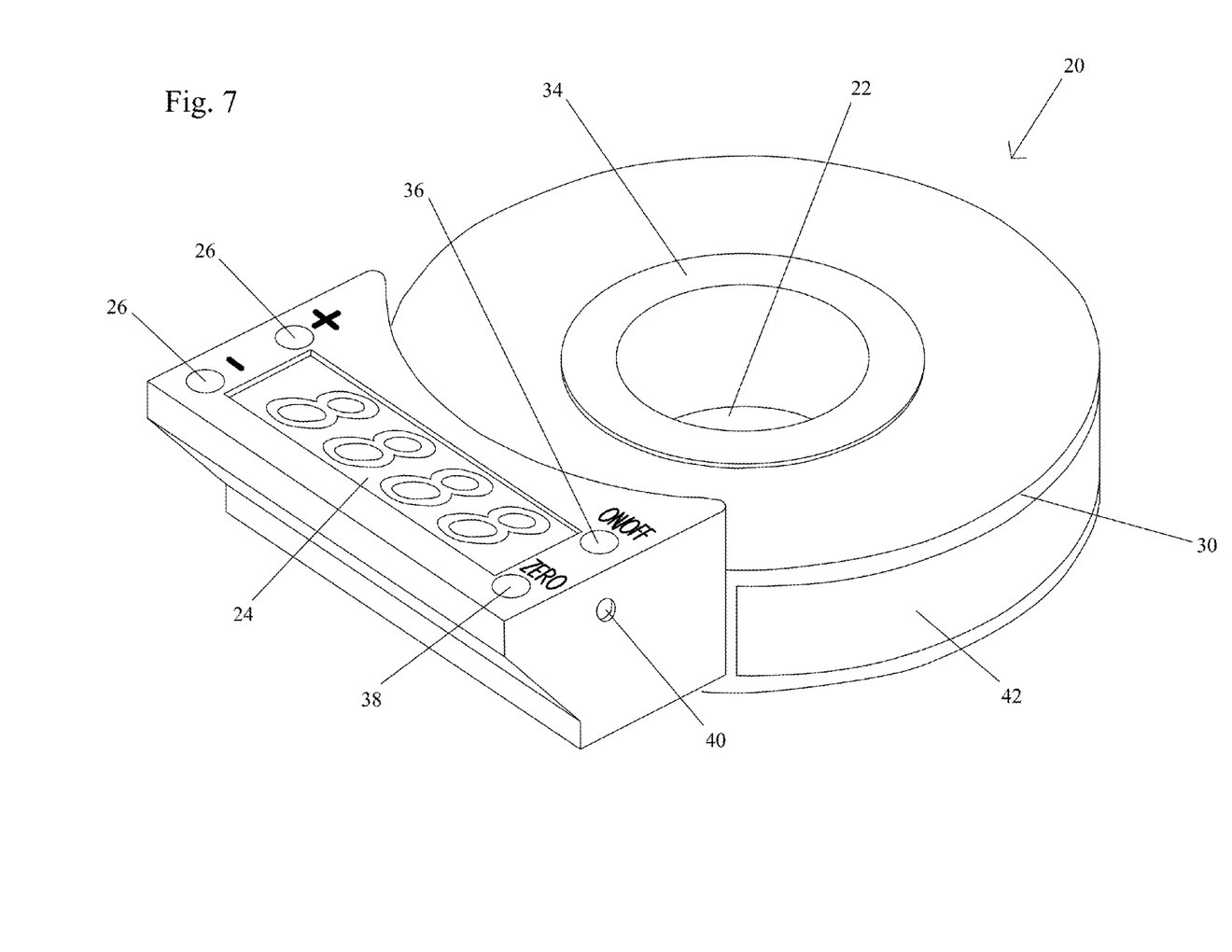
FIG. 7 shows a top perspective view of a tongue weight donut scale in an alternative embodiment of the present invention.

FIG. 7 shows additional detail not shown in FIG. 6 of features, which may be included in any of the embodiments of a tongue weight donut scale 20 described herein. The calibration buttons 26 include an increase button and a decrease button. The tongue weight donut scale 20 of FIG. 7 also includes a power button 36 to turn the power on and off, a tare button 38 to zero the weight output on the display for the current weight conditions, and a reflective material 42 around a portion of the outer circumference of the scale body 30. In some embodiments, the reflective material 42 is a strip of reflective tape adhered to the scale body 30. In some embodiments, the reflective tape is red reflective tape.

The electronics may be powered by any electrical power source, including, but not limited to, one or more batteries, one or more solar cells, or an external electrical power source, such as electrical power transmitted from the towing vehicle through a wire into the power cord socket 40 shown in FIG. 7. In some embodiments, the electrical power from the towing vehicle is 12-volt direct current power.

Tongue weight donut scales may be designed to work with all existing commercial popular sizes of hitch balls and ball supports. A tongue weight donut scale may also be used in ways other than measuring trailer tongue weights. In some embodiments, a tongue weight donut scale may be used as a small, portable, light-weight, independent ring scale to measure the weight of any object placed upon it. A tongue weight donut scale may be carried in a pants pocket or in a tool box to become a staple in a construction worker's tool arsenal. A tongue weight donut scale may be put under the corners of, or centered under, any load within its load limits to determine a scaled weight.

Other objects to be weighed by a tongue weight donut scale may include, but are not limited to, luggage, food, water, metals, money, commodities, rocks, and bowling balls. In some embodiments, a tongue weight donut scale assembly includes a saddle to house the tongue weight donut scale so a user may drive a vehicle wheel on top of it to get a weight reading under that wheel. In some embodiments, a tongue weight donut scale is used to weigh a load to be lifted to determine whether its weight is over a personal lifting limit, such as, for example, 50 pounds.

In some embodiments, a tongue weight donut scale is used as a quick and easy device by law enforcement to check or test the tongue weight of a hauler to be sure they are trailering within safe and legal limits.

In a method of installing a tongue weight donut scale 20, with the hitch ball nut 18 separated from the hitch ball anchor bolt 16, the hitch ball anchor bolt 16 is placed through the opening 22 of the tongue weight donut scale 20 from the top and placed through the opening 14 of the ball support 12. The hitch ball nut 18 is then threaded onto the end of the hitch ball anchor bolt 16. The hitch ball nut 18 is preferably tightened to meet the manufacturer's recommended torque values of the class and size of hitch system to which the hitch ball is being attached. Once the nut is tightened to the above value, the donut scale is calibrated to zero and all future live loads applied to the top planar surface are measured independent of the downward force that the tightening of the nut caused on the load cell or donut scale above it.

In a method of determining a tongue weight of a trailer installed on a hitch with a tongue weight donut scale 20, with the tongue weight donut scale 20 turned on, the tongue weight of the trailer is read on the display window 24 of the tongue weight donut scale 20. In some embodiments, the display is an LED display.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tongue weight donut scale comprising:
    a tongue weight donut scale body having an upper planar surface, a lower planar surface, and a central through-hole having an inner diameter, wherein the upper planar surface is placed below a base of a hitch ball, the lower planar surface, being the lowest point of the tongue weight donut scale, is placed on an upper surface of a ball support, thereby allowing 360-degree rotation of the tongue weight donut scale while resting on the upper surface of the ball support, and the inner diameter is selected such that the central through-hole is capable of receiving a hitch ball anchor bolt of the hitch ball;
    a weight sensor coupled to the tongue weight donut scale body and generating a signal representative of a weight on the tongue weight donut scale;
    an indicator box converting the signal from the weight sensor into a weight value and providing a weight value output; and
    a display window displaying the weight value output from the indicator box;
    wherein the indicator box is located within the tongue weight donut scale body.

2. The tongue weight donut scale of claim 1, wherein the weight sensor comprises a load cell comprising at least one strain gauge attached to the tongue weight donut scale body to detect a deflection caused by a weight applied to the upper planar surface of the tongue weight donut scale body.

3. The tongue weight donut scale of claim 1, wherein the tongue weight donut scale is waterproof.

4. The tongue weight donut scale of claim 1 further comprising a reflective material located on an outer surface of the tongue weight donut scale body.

5. The tongue weight donut scale of claim 1, wherein the tongue weight donut scale body is made of stainless steel.

6. The tongue weight donut scale of claim 1 further comprising a power source supplying power to the indicator box.

7. The tongue weight donut scale of claim 1 further comprising a direct-current power cord socket in an outer surface of the tongue weight donut scale electrically connected to the indicator box.

8. A method of installing a tongue weight donut scale on a trailer hitch comprising the steps of:
    a) providing a tongue weight donut scale comprising:
       a tongue weight donut scale body having an upper planar surface, a lower planar surface, and the central opening having an inner diameter;
       a weight sensor coupled to the tongue weight donut scale body and generating a signal representative of a weight on the tongue weight donut scale;
       an indicator box converting the signal from the weight sensor into a weight value and providing a weight value output; and
       a display window displaying the weight value output from the indicator box;
       wherein the indicator box is located within the tongue weight donut scale body;
    b) inserting a hitch ball anchor bolt of a hitch ball of the trailer hitch through the central opening of the tongue weight donut scale;
    c) inserting the hitch ball anchor bolt through a ball support opening of a ball support of the trailer hitch such that the lower planar surface of the tongue weight donut scale rests on an upper surface of the ball support; and
    d) threading a hitch ball nut onto an end of the hitch ball anchor bolt extending through the ball support opening and tightening the hitch ball nut to maintain the tongue weight donut scale between a base of the hitch ball and the upper surface of the ball support;
    wherein the lower planar surface of the tongue weight donut scale body is the lowest point of the tongue weight donut scale, thereby allowing 360-degree rotation of the tongue weight donut scale while resting on the upper surface of the ball support.

9. A trailer hitch assembly comprising:
    a ball mount having a ball mount opening and a ball mount upper surface;
    a tongue weight donut scale comprising:
       a tongue weight donut scale body having an upper planar surface, a lower planar surface resting on the ball mount upper surface, and the central opening having an inner diameter;
       a weight sensor coupled to the tongue weight donut scale body and generating a signal representative of a weight on the tongue weight donut scale;
       an indicator box converting the signal from the weight sensor into a weight value and providing a weight value output; and
       a display window displaying the weight value output from the indicator box;
    a hitch ball assembly comprising:
       a hitch ball; and
       a hitch ball anchor bolt integral with and extending from a base of the hitch ball, the hitch ball extending through the central opening of the tongue weight donut scale and the ball mount opening of the ball mount; and
    a hitch ball nut threaded on an end of the hitch ball anchor bolt below the ball mount;
    wherein the lower planar surface of the tongue weight donut scale body is the lowest point of the tongue weight donut scale, thereby allowing 360-degree rotation of the tongue weight donut scale while resting on the ball mount upper surface;
    wherein the indicator box is housed in a radial extension extending radially from the tongue weight donut scale body and the display window is located on a surface of the extension.

10. The trailer hitch assembly of claim 9, wherein the weight sensor comprises a load cell comprising at least one strain gauge attached to the tongue weight donut scale body to detect a deflection caused by a weight applied to the upper planar surface of the tongue weight donut scale body.

11. The trailer hitch assembly of claim 9, wherein the tongue weight donut scale is waterproof.

12. The trailer hitch assembly of claim 9 further comprising a reflective material located on an outer surface of the tongue weight donut scale body parallel to a central axis of the tongue weight donut scale body.

13. The trailer hitch assembly of claim 9, wherein the tongue weight donut scale body is made of stainless steel.

14. The trailer hitch assembly of claim 9 further comprising a power source supplying power to the indicator box.

15. The trailer hitch assembly of claim 9 further comprising a direct-current power cord socket in an outer surface of the tongue weight donut scale electrically connected to the indicator box.

16. A tongue weight donut scale comprising:
   a tongue weight donut scale body having an upper planar surface, a lower planar surface, and a central through-hole having an inner diameter, wherein the upper planar surface is placed below a base of a hitch ball, the lower planar surface, being the lowest point of the tongue weight donut scale, is placed on an upper surface of a ball support, thereby allowing 360-degree rotation of the tongue weight donut scale while resting on the upper surface of the ball support, and the inner diameter is selected such that the central through-hole is capable of receiving a hitch ball anchor bolt of the hitch ball;
   a weight sensor coupled to the tongue weight donut scale body and generating a signal representative of a weight on the tongue weight donut scale;
   an indicator box converting the signal from the weight sensor into a weight value and providing a weight value output; and
   a display window displaying the weight value output from the indicator box;
   wherein the indicator box is located in a radial extension extending radially from the tongue weight donut scale body and the display window is located on a surface of the extension.

17. A method of installing a tongue weight donut scale on a trailer hitch comprising the steps of:
   a) providing the tongue weight donut scale comprising:
   a tongue weight donut scale body having an upper planar surface, a lower planar surface, and the central opening having an inner diameter;
   a weight sensor coupled to the tongue weight donut scale body and generating a signal representative of a weight on the tongue weight donut scale;
   an indicator box converting the signal from the weight sensor into a weight value and providing a weight value output; and
   a display window displaying the weight value output from the indicator box;
   wherein the indicator box is located in a radial extension extending radially from the tongue weight donut scale body and the display window is located on a surface of the extension;
   b) inserting a hitch ball anchor bolt of a hitch ball of the trailer hitch through the central opening of the tongue weight donut scale;
   c) inserting the hitch ball anchor bolt through a ball support opening of a ball support of the trailer hitch such that the lower planar surface of the tongue weight donut scale rests on an upper surface of the ball support; and
   d) threading a hitch ball nut onto an end of the hitch ball anchor bolt extending through the ball support opening and tightening the hitch ball nut to maintain the tongue weight donut scale between a base of the hitch ball and the upper surface of the ball support;
   wherein the lower planar surface of the tongue weight donut scale body is the lowest point of the tongue weight donut scale, thereby allowing 360-degree rotation of the tongue weight donut scale while resting on the upper surface of the ball support.

18. A trailer hitch assembly comprising:
   a ball mount having a ball mount opening and a ball mount upper surface;
   a tongue weight donut scale comprising:
      a tongue weight donut scale body having an upper planar surface, a lower planar surface resting on the ball mount upper surface, and the central opening having an inner diameter;
      a weight sensor coupled to the tongue weight donut scale body and generating a signal representative of a weight on the tongue weight donut scale;
      an indicator box converting the signal from the weight sensor into a weight value and providing a weight value output; and
      a display window displaying the weight value output from the indicator box;
   a hitch ball assembly comprising:
      a hitch ball; and
      a hitch ball anchor bolt integral with and extending from a base of the hitch ball, the hitch ball extending downward through the central opening of the tongue weight donut scale and the ball mount opening of the ball mount; and
   a hitch ball nut threaded on an end of the hitch ball anchor bolt below the ball mount;
   wherein the lower planar surface of the tongue weight donut scale body is the lowest point of the tongue weight donut scale, thereby allowing 360-degree rotation of the tongue weight donut scale while resting on the ball mount upper surface; and
   wherein the indicator box is located within the tongue weight donut scale body.

* * * * *